(12) United States Patent
Yang et al.

(10) Patent No.: US 12,003,477 B2
(45) Date of Patent: Jun. 4, 2024

(54) COMMUNICATION METHOD AND RELATED DEVICE

(71) Applicant: HUAWEI TECHNOLOGIES CO., LTD., Shenzhen (CN)

(72) Inventors: Renzhi Yang, Shanghai (CN); Bin Wang, Shanghai (CN); Jiyong Jiang, Shanghai (CN); Teng Zhang, Shanghai (CN); Yanming Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 44 days.

(21) Appl. No.: 17/615,324

(22) PCT Filed: Jun. 23, 2020

(86) PCT No.: PCT/CN2020/097569
§ 371 (c)(1),
(2) Date: Nov. 30, 2021

(87) PCT Pub. No.: WO2020/259459
PCT Pub. Date: Dec. 30, 2020

(65) Prior Publication Data
US 2022/0224670 A1    Jul. 14, 2022

(30) Foreign Application Priority Data

Jun. 24, 2019    (CN) .......................... 201910549545.0

(51) Int. Cl.
*H04L 61/2517* (2022.01)
*H04L 61/256* (2022.01)
(Continued)

(52) U.S. Cl.
CPC ........ *H04L 61/2517* (2013.01); *H04L 61/256* (2013.01); *H04W 60/04* (2013.01); *H04W 76/12* (2018.02); *H04W 76/14* (2018.02)

(58) Field of Classification Search
CPC .. H04L 61/2517; H04L 61/256; H04W 76/12; H04W 76/14; H04W 60/04
See application file for complete search history.

(56) References Cited

U.S. PATENT DOCUMENTS 7,706,401 B2 *    4/2010    Bae .................... H04L 65/1101
                                                           370/352
8,631,155 B2       1/2014    Gopalakrishnan et al.
(Continued)

FOREIGN PATENT DOCUMENTS

CN    101056271 A    10/2007
CN    101938532 A    1/2011
(Continued)

OTHER PUBLICATIONS

Yuan Wei et al., "A New Method for Symmetric NAT Traversal in UDP and TCP", Aug. 2018, 8 pages, XP055371945.
(Continued)

*Primary Examiner* — Thu V Nguyen
*Assistant Examiner* — Angela M Widhalm De Rodriguez
(74) *Attorney, Agent, or Firm* — Maier & Maier, PLLC

(57) ABSTRACT

Embodiments of this application disclose a communication method and a related device. The method includes: A symmetric device listens on N local public ports, where N is a natural number greater than 1; and when the symmetric device receives a hole punching packet from the N local public ports, the symmetric device sends a response packet to a cone device based on the hole punching packet, so that the symmetric device establishes a communication connection to the cone device, where the hole punching packet is sent by the cone device, and the response packet carries a first network information mapping relationship. The cone device may directly communicate with the symmetric
(Continued)

device, so that there is no need for a server having a data relay function, and costs of deploying the server are reduced.

20 Claims, 6 Drawing Sheets

(51) Int. Cl.
*H04W 60/04* (2009.01)
*H04W 76/12* (2018.01)
*H04W 76/14* (2018.01)

(56) References Cited

U.S. PATENT DOCUMENTS

| | | | | |
|---|---|---|---|---|
| 2007/0076729 | A1* | 4/2007 | Takeda | H04L 61/2564 |
| | | | | 370/401 |
| 2008/0215669 | A1* | 9/2008 | Gaddy | H04L 63/029 |
| | | | | 709/227 |
| 2008/0225868 | A1* | 9/2008 | Sehgal | H04L 61/2514 |
| | | | | 370/401 |
| 2008/0240131 | A1 | 10/2008 | Sehgal et al. | |
| 2009/0138611 | A1* | 5/2009 | Miao | H04L 61/2575 |
| | | | | 709/228 |
| 2009/0154464 | A1* | 6/2009 | Kim | H04L 61/256 |
| | | | | 370/392 |
| 2011/0055392 | A1* | 3/2011 | Shen | H04L 61/2575 |
| | | | | 709/228 |
| 2012/0311329 | A1* | 12/2012 | Medina | H04W 12/069 |
| | | | | 713/168 |
| 2013/0244614 | A1* | 9/2013 | Santamaria | H04W 12/069 |
| | | | | 455/411 |
| 2017/0295136 | A1 | 10/2017 | Ribeiro | |
| 2019/0327135 | A1* | 10/2019 | Johnson | H04L 67/34 |

FOREIGN PATENT DOCUMENTS

| | | | |
|---|---|---|---|
| CN | 101945141 A | | 1/2011 |
| CN | 101977249 A | | 2/2011 |
| CN | 104104741 A | | 10/2014 |
| CN | 104363312 A | | 2/2015 |
| CN | 107360275 A | | 11/2017 |
| CN | 107580082 A | | 1/2018 |
| CN | 108886539 A | | 11/2018 |
| CN | 109600449 A | | 4/2019 |
| CN | 109831547 A | | 5/2019 |
| CN | 109831547 B | * | 2/2022 |
| JP | 2011077920 A | | 4/2011 |

OTHER PUBLICATIONS

P. Srisuresh et al., "State of Peer-to-Peer (P2P) Communication across Network Address Translators (NATs)", Network Working Group, Request for Comments: 5128, Mar. 2008, 32 pages, XP015055197.

Wei et al., "New Method for Transversing TCP/UDP NAT for Symmetric NAT", Proceedings of Lectures at the National Conference No. 70 (New IT Technology Infrastructure for the Era of the Information Explosion), pp. 281-282, Mar. 13, 2008 (with English Abstract), 4 pages.

* cited by examiner

COMMUNICATION METHOD AND RELATED DEVICE

CROSS-REFERENCE TO RELATED APPLICATIONS

This application is a National Stage of International Application No. PCT/CN2020/097569, filed on Jun. 23, 2020, which claims priority to Chinese Patent Application No. 201910549545.0, filed on Jun. 24, 2019. Both of the aforementioned applications are hereby incorporated by reference in their entireties.

TECHNICAL FIELD

The embodiments relate to the communications field, and in particular, to a communication method and a related device.

BACKGROUND

Intelligent devices are widely used in daily life of everyone and have gradually become a part of people's lives. A network environment in which a device is used is very complex. Currently, to resolve a deficiency of internet protocol version 4 (, IPv4) public network internet protocol addresses (IP addresses), a network address translation (NAT) technology is introduced. The NAT technology, also referred to as an address proxy, provides translation between a private address and a public IP address, and supports communication between an intranet and a public network. Although the NAT technology brings convenience, while resolving a problem of IP address deficiency, NAT causes a problem of NAT traversal.

There are totally four types of NAT traversal scenarios: a full cone NAT scenario, a restricted cone NAT scenario, a port restricted cone NAT scenario, and a symmetric NAT scenario.

For a device in the port restricted cone NAT scenario and a device in the symmetric NAT scenario, a traversal using relays around NAT (TURN) technology needs to be used.

In the TURN technology, a server is needed to forward data to implement data exchange between the device of the port restricted cone NAT scenario and the device of the symmetric NAT scenario. A larger amount of data exchanged between the device of the port restricted cone NAT scenario and the device of the symmetric NAT scenario indicates larger bandwidth of the server for performing data forwarding. Therefore, costs of deploying the server are increased.

SUMMARY

Embodiments provide a communication method and a related device. A symmetric device listens on N local public ports, and when receiving, from the N local public ports, a hole punching packet sent by a cone device, the symmetric device sends a response packet to the cone device. The response packet carries a first network information mapping relationship, and the cone device may establish a communication connection to the symmetric device based on the first network information mapping relationship. The cone device may directly communicate with the symmetric device, so that there is no need for a server having a data relay function, and costs of deploying the server are reduced.

In view of this, the embodiments provide the following solutions.

According to a first aspect, an embodiment provides a communication method. The method includes: a symmetric device listens on N local public ports, where N is a natural number greater than 1; and when the symmetric device receives a hole punching packet from the N local public ports, the symmetric device sends a response packet to a cone device based on the hole punching packet, so that the symmetric device establishes a communication connection to the cone device, where the hole punching packet is sent by the cone device, and the response packet carries a first network information mapping relationship. The first network information mapping relationship includes a first public internet protocol (IP) address of the symmetric device and a first public port number of the symmetric device.

In this embodiment, the symmetric device listens on the N local public ports. When receiving, from the N local public ports, the hole punching packet sent by the cone device, the symmetric device sends the response packet to the cone device. The response packet carries the first network information mapping relationship, and the cone device may establish the communication connection to the symmetric device based on the first network information mapping relationship. The cone device may directly communicate with the symmetric device, so that there is no need for a server having a data relay function, and costs of deploying the server are reduced.

Optionally, in a possible implementation of the first aspect, before the symmetric device listens on the N local public ports, the method may further include:

The symmetric device sends a first connection establishment request packet to a signaling server, where the first connection establishment request packet carries first network information, and because the first connection establishment request packet carries the first network information, the signaling server determines the cone device based on the first network information and sends a second network information mapping relationship to the cone device, where the second network information mapping relationship includes a second public IP address of the symmetric device and a second public port number of the symmetric device; the first network information includes a user identity (ID) of the cone device, a media access control (MAC) address of the cone device, or a user name of the cone device; and the signaling server sends the second network information mapping relationship to the cone device, and provides an address and a port number of the symmetric device for the cone device, to facilitate the cone device to send the hole punching packet.

Optionally, in a possible implementation of the first aspect, before the symmetric device sends the connection establishment request packet to the signaling server, the method may further include:

The symmetric device sends a first registration packet to the signaling server, where the first registration packet carries the second network information mapping relationship, and the second network information mapping relationship includes second network information, where the second network information includes a user identity (ID) of the symmetric device, a media access control (MAC) address of the symmetric device, or a user name of the symmetric device.

The symmetric device sends the first registration packet that includes the second network information mapping relationship to the signaling server, so that the signaling server may send the second network information mapping relationship of the symmetric device to the cone device, to facilitate the cone device to send the hole punching packet.

According to a second aspect, an embodiment provides a communication method. The method includes: a cone device sends hole punching packets to M public ports of a symmetric device, where M is a natural number greater than 1; and the cone device establishes a communication connection to the symmetric device based on a response packet, where the response packet is a packet sent by the symmetric device based on the hole punching packet, and the response packet carries a first network information mapping relationship. The first network information mapping relationship includes a first public internet protocol (IP) address of the symmetric device and a first public port number of the symmetric device.

In this embodiment, the symmetric device listens on the N local public ports. When receiving, from the N local public ports, the hole punching packet sent by the cone device, the symmetric device sends the response packet to the cone device. The response packet carries the first network information mapping relationship, and the cone device may establish the communication connection to the symmetric device based on the first network information mapping relationship. The cone device may directly communicate with the symmetric device, so that there is no need for a server having a data relay function, and costs of deploying the server are reduced.

Optionally, in a possible implementation of the second aspect, before the cone device sends the hole punching packets to the M public ports of the symmetric device, the method may further include:

The cone device receives a second network information mapping relationship, where the second network information mapping relationship is sent by a signaling server to the cone device based on a first connection establishment request packet; the first connection establishment request packet is sent by the symmetric device; and the second network information mapping relationship includes a second public IP address of the symmetric device and a second public port number of the symmetric device. When the symmetric device initiates a communication request to the cone device, the symmetric device sends the first connection establishment request packet to the signaling server, and the signaling server sends the second network information mapping relationship to the cone device based on the first connection establishment request packet. The cone device sends the hole punching packets to the symmetric device based on the second network information mapping relationship.

Optionally, in a possible implementation of the second aspect, before the cone device sends the hole punching packets to the M public ports of the symmetric device, the method may further include:

The cone device sends a second connection establishment request packet to a signaling server, where the second connection establishment request packet carries second network information, so that the signaling server sends a second network information mapping relationship to the cone device based on the second network information; and the cone device receives the second network information mapping relationship. When the cone device initiates a communication request to the symmetric device, the cone device sends the second connection establishment request packet to the signaling server, and the signaling server sends the second network information mapping relationship to the cone device based on the second connection establishment request packet. The cone device sends the hole punching packets to the symmetric device based on the second network information mapping relationship.

Optionally, in a possible implementation of the second aspect, that the cone device sends the hole punching packets to the M public ports of the symmetric device includes:

The cone device sends the hole punching packets to the M public ports of the symmetric device based on the second network information mapping relationship.

Optionally, in a possible implementation of the second aspect, before the cone device receives the second network information mapping relationship, the method further includes:

The cone device sends a second registration packet to the signaling server, where the second registration packet carries first network information, so that the signaling server may store the first network information related to the cone device.

According to a third aspect, an embodiment provides a computer device. The computer device may include a processor and a memory, or includes an input/output (I/O) interface, a processor, and a memory. The memory stores program instructions. The processor is configured to execute the program instructions stored in the memory, to enable the computer device to perform the communication method according to any one of the first aspect or the possible implementations of the first aspect.

According to a fourth aspect, an embodiment provides a computer device. The computer device may include a processor and a memory, or includes an input/output (I/O) interface, a processor, and a memory. The memory stores program instructions. The processor is configured to execute the program instructions stored in the memory, to enable the computer device to perform the communication method according to any one of the second aspect or the possible implementations of the second aspect.

According to a fifth aspect, a computer-readable storage medium is provided. The computer-readable storage medium stores instructions. When the instructions are run on a computer device, the computer device is enabled to perform the communication method according to any one of the first aspect or the possible implementations of the first aspect.

According to a sixth aspect, a computer-readable storage medium is provided. The computer-readable storage medium stores instructions. When the instructions are run on a computer device, the computer device is enabled to perform the communication method according to any one of the second aspect or the possible implementations of the second aspect.

According to a seventh aspect, a computer program product including instructions is provided. When the computer program product runs on a computer, the computer is enabled to perform the communication method according to any one of the first aspect or the possible implementations of the first aspect.

According to an eighth aspect, a computer program product including instructions is provided. When the computer program product runs on a computer, the computer is enabled to perform the communication method according to any one of the second aspect or the possible implementations of the second aspect.

According to a ninth aspect, a chip system is provided. The chip system includes a processor and is configured to support a packet forwarding apparatus in implementing a function in any one of the first aspect or the possible implementations of the first aspect. In a possible implementation, the chip system further includes a memory. The memory is configured to store necessary program instructions and data of the packet forwarding apparatus. The chip system may include a chip or may include a chip and another discrete component.

According to a tenth aspect, a chip system is provided. The chip system includes a processor configured to support a packet processing apparatus in implementing a function in any one of the second aspect or the possible implementations of the second aspect. In a possible implementation, the chip system further includes a memory. The memory is configured to store necessary program instructions and data of the packet processing apparatus. The chip system may include a chip or may include a chip and another discrete component.

For effects brought by any implementation in the third aspect, the fifth aspect, the seventh aspect, and the ninth aspect, refer to effects brought by different implementations in the first aspect. Details are not described herein again.

For effects brought by any implementation in the fourth aspect, the sixth aspect, the eighth aspect, and the tenth aspect, refer to effects brought by different implementations in the second aspect. Details are not described herein again.

It can be understood from the foregoing solutions that the embodiments have at least the following advantages:

The symmetric device listens on the N local public ports. When receiving, from the N local public ports, the hole punching packet sent by the cone device, the symmetric device sends the response packet to the cone device. The response packet carries the first network information mapping relationship, and the cone device may establish the communication connection to the symmetric device based on the first network information mapping relationship. The cone device may directly communicate with the symmetric device, so that there is no need for a server having a data relay function, and costs of deploying the server are reduced.

DETAILED DESCRIPTION OF THE EMBODIMENTS

Embodiments provide a communication method and a related device. A symmetric device listens on N local public ports. When receiving, from the N local public ports, a hole punching packet sent by a cone device, the symmetric device returns a response packet to the cone device. The response packet carries a first network information mapping relationship, and the cone device may establish a communication connection to the symmetric device based on the first network information mapping relationship. The cone device may directly communicate with the symmetric device, so that there is no need for a server having a data relay function, and costs of deploying the server are reduced.

In the embodiments and accompanying drawings, the terms "first", "second", "third", "fourth", and the like (if existent) are intended to distinguish between similar objects but do not necessarily indicate a specific order or sequence. It should be understood that the data termed in such a way are interchangeable in proper circumstances, so that the embodiments described herein can be implemented in orders except the order illustrated or described herein. In addition, the terms "include", "have", and any other variants mean to cover non-exclusive inclusion, for example, a process, method, system, product, or device that includes a list of steps or units is not necessarily limited to those expressly listed steps and units, but may include other steps or units not expressly listed or inherent to such a process, method, product, or device.

For ease of understanding, concepts in the embodiments are first briefly described.

Network address translation (NAT) technology: the NAT is an internet engineering task force (IETF) standard that allows a whole organization to access the Internet with a public internet protocol (IP) address. As its name suggests, the NAT is a technology for translating an internal private address (IP address) into a valid public IP address. Therefore, the NAT can effectively resolve a problem of public IP address deficiency. Communication between devices to which the NAT technology is applied is referred to as NAT traversal.

Figure 1:
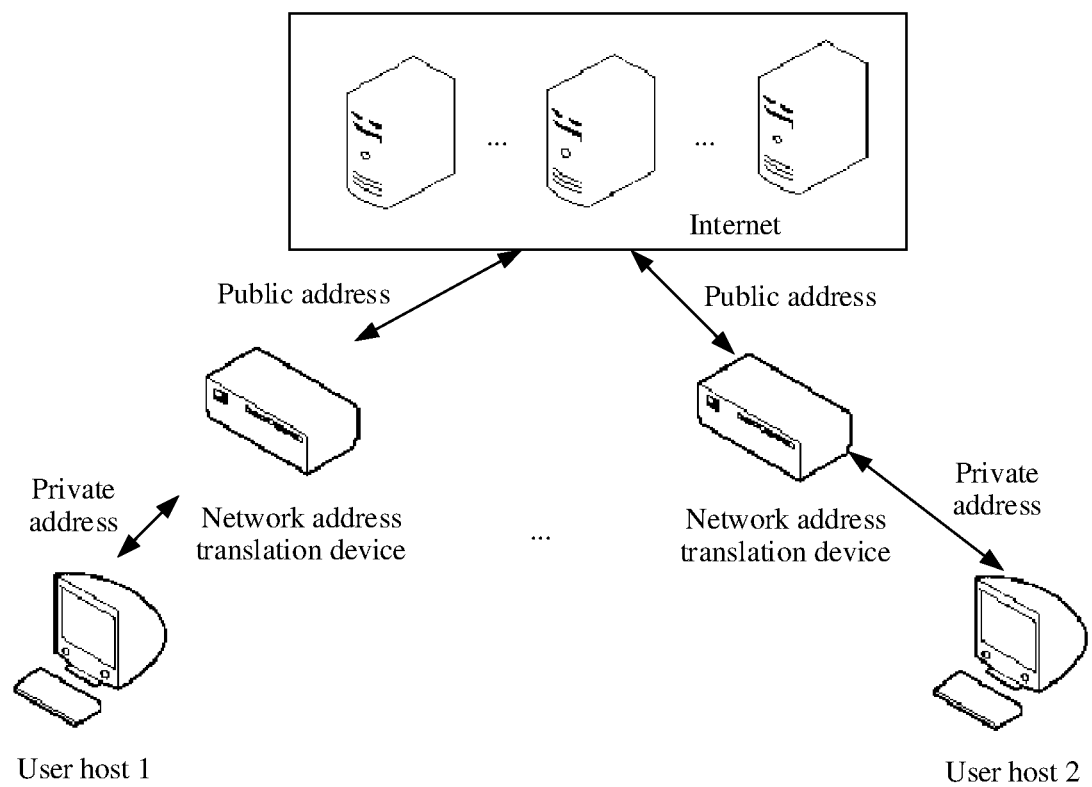
FIG. 1 is a schematic diagram of a network structure according to an embodiment.

Refer to FIG. 1, which is a schematic diagram of a network structure according to an embodiment. A user host 1 and a user host 2 in FIG. 1 are devices to which the NAT technology is applied and are referred to as NAT devices (or NAT hosts). For example, the user host 1 sends a packet to the user host 2. The user host 1 has a private address 192.168.1.2 and a private port 4096. After a packet carrying network information of the user host 1 is processed by a network address translation device (or referred to as a NAT gateway), the packet carries a public IP address 202.20.65.4 and a public port 4097 of the user host 1. A destination of the packet is the user host 2. A specific address includes a public IP address 202.20.65.5 and a public port 4099 of the user host 2. The public IP address of the user host 2 is also generated by a network address translation device connected to the user host 2. For example, the network address translation device generates the public IP address 202.20.65.5 and the public port 4099 of the user host 2 based on a private address 192.168.1.3 and a private port 4098 of the user host 2.

Common NAT traversal scenarios are classified into the following four types, where iAddr is a private address and iPort is a private port; eAddr is a public IP address and ePort is a public port; and hAddr is a public IP address of a specific device and hPort is a public port of the specific device.

1. Full cone NAT

All request packets sent from a same source private address and a same source port number are mapped to a same source public IP address and a same source port number, and any extranet host may send a packet to this intranet host by using the mapped source public IP address and the mapped source port number.

The full cone NAT is characterized in that once an intranet host port pair (iAddr:iPort) is mapped to (eAddr:ePort) by the NAT gateway, all subsequent (iAddr:iPort) packets are translated into (eAddr:ePort); and a packet sent by any extranet host to (eAddr:ePort) is translated and then forwarded to (iAddr:iPort).

2. Restricted cone NAT

All request packets sent from a same source private address and a same source port number are mapped to a same source public IP address and a same source port number. Different from the full cone NAT, an extranet host can send a packet only to an intranet host that has previously sent a packet to the extranet host.

The restricted cone NAT is characterized in that once the intranet host port pair (iAddr:iPort) is mapped to the (eAddr:ePort), all the subsequent (iAddr:iPort) packets are translated into the (eAddr:ePort); and only after the (iAddr:iPort) sends data to a specific extranet host hAddr, a packet sent by the host hAddr from any port to the (eAddr:ePort) is forwarded to the (iAddr:iPort).

3. Port restricted cone NAT

The port restricted cone NAT is similar to the restricted cone NAT, but the port restricted cone NAT includes a port number. For example, if an extranet host with a source private address X and a source port P needs to send a packet to an intranet host, the intranet host needs to have previously sent a packet to the host with the source private address X and the source port P.

The port restricted cone NAT is characterized in that once the intranet host port pair (iAddr:iPort) is mapped to the (eAddr:ePort), all the subsequent (iAddr:iPort) packets are translated into the (eAddr:ePort); and only after the (iAddr:iPort) sends data to a specific extranet host port pair (hAddr:hPort), a packet sent from the (hAddr:hPort) to the (eAddr:ePort) is forwarded to the (iAddr:iPort).

4. Symmetric NAT

All requests sent from a same source private address and a same source port number to a specific destination public IP address and a specific destination port number are mapped to a same source public IP address and a same source port number. If a same host sends a packet from a same source private address and a same source port number but to a different destination (a destination public IP address or a destination port number or both are different), a symmetric NAT device uses a different mapping. In addition, only an extranet host that has received a packet can send a packet to an intranet host.

Figure 2:
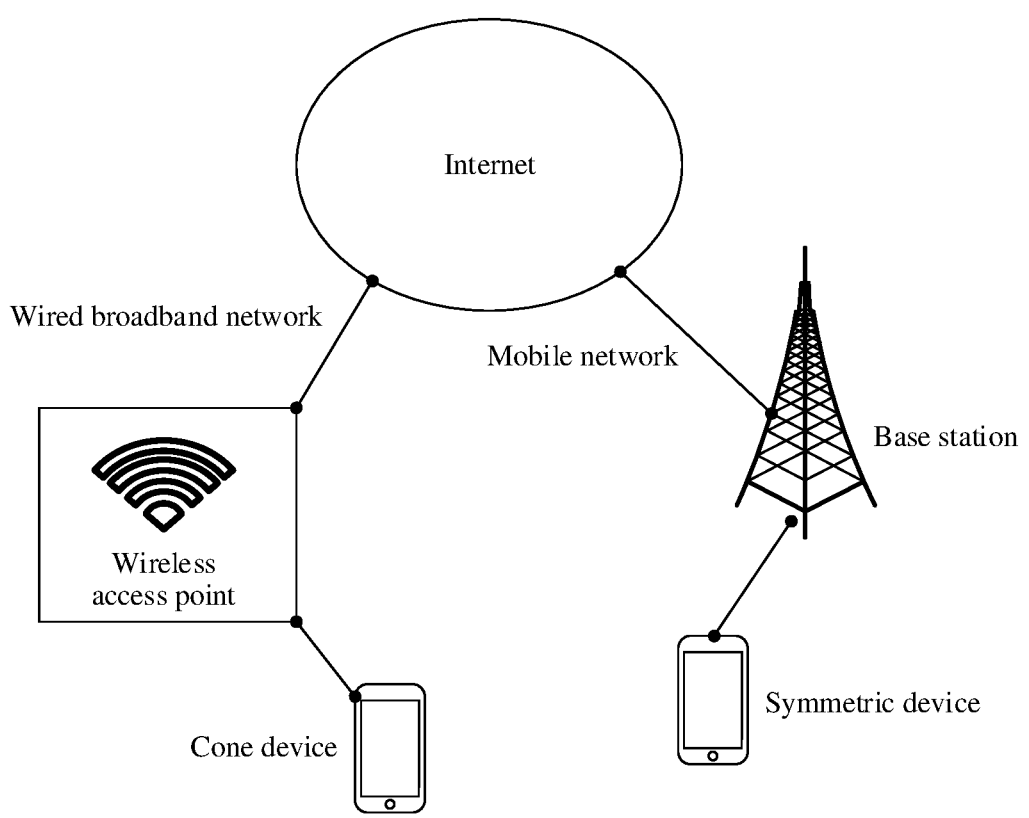
FIG. 2 is a schematic diagram of communication between a cone device and a symmetric device according to an embodiment.

A communication method provided in an embodiment is first described. Refer to FIG. 2, which is a schematic diagram of communication between a cone device and a symmetric device in this embodiment.

A wireless access point (AP) accesses the Internet through a wired broadband network and provides an Internet access service for various terminal devices. Because the wired broadband network is mainly the port restricted cone NAT, a terminal device (UE) that uses an Internet service through the wireless access point may be referred to as a cone device.

A base station (BS) accesses the Internet through a mobile network. The mobile network may be a $4^{th}$ generation (4G) mobile communications network or a $5^{th}$ generation (5G) mobile communications network. Because the mobile network is mainly the symmetric NAT, a terminal device that uses an Internet service through the base station may be referred to as a symmetric device.

When a communication connection needs to be established between a symmetric device and a cone device, for example, when instant messaging software in the symmetric device needs to send a message to instant messaging software in the cone device, or when the instant messaging software in the cone device needs to send a message to the instant messaging software in the symmetric device, a solution proposed in the embodiments may be applied to establish the communication connection.

It should be noted that the symmetric device and the cone device may include mobile terminals, such as a mobile phone, a tablet computer, a notebook computer, a palmtop computer, a personal digital assistant (PDA), a portable media player (PMP), a navigation apparatus, and a wearable device, and fixed terminals, such as a digital television and a desktop computer.

In this embodiment, the symmetric device listens on N local public ports, where N is a natural number greater than 1. When detecting, from the N local public ports, a packet sent by the cone device, the symmetric device sends a response packet to the cone device, and the cone device establishes a communication connection to the symmetric device based on the response packet. The packet detected from the local public ports by the symmetric device is sent by the cone device to M public ports randomly selected from a specific packet port range of the symmetric device. In other words, the cone device sends packets to the M public ports of the symmetric device. The packets are referred to as hole punching packets. The symmetric device listens on the N local public ports. When receiving, from the N local public ports, the hole punching packet sent by the cone device, the symmetric device sends the response packet to the cone device. The response packet carries the first network information mapping relationship, and the cone device may establish the communication connection to the symmetric device based on the first network information mapping relationship. The cone device may directly communicate with the symmetric device, so that there is no need for a server having a data relay function, and costs of deploying the server are reduced.

Figure 3:
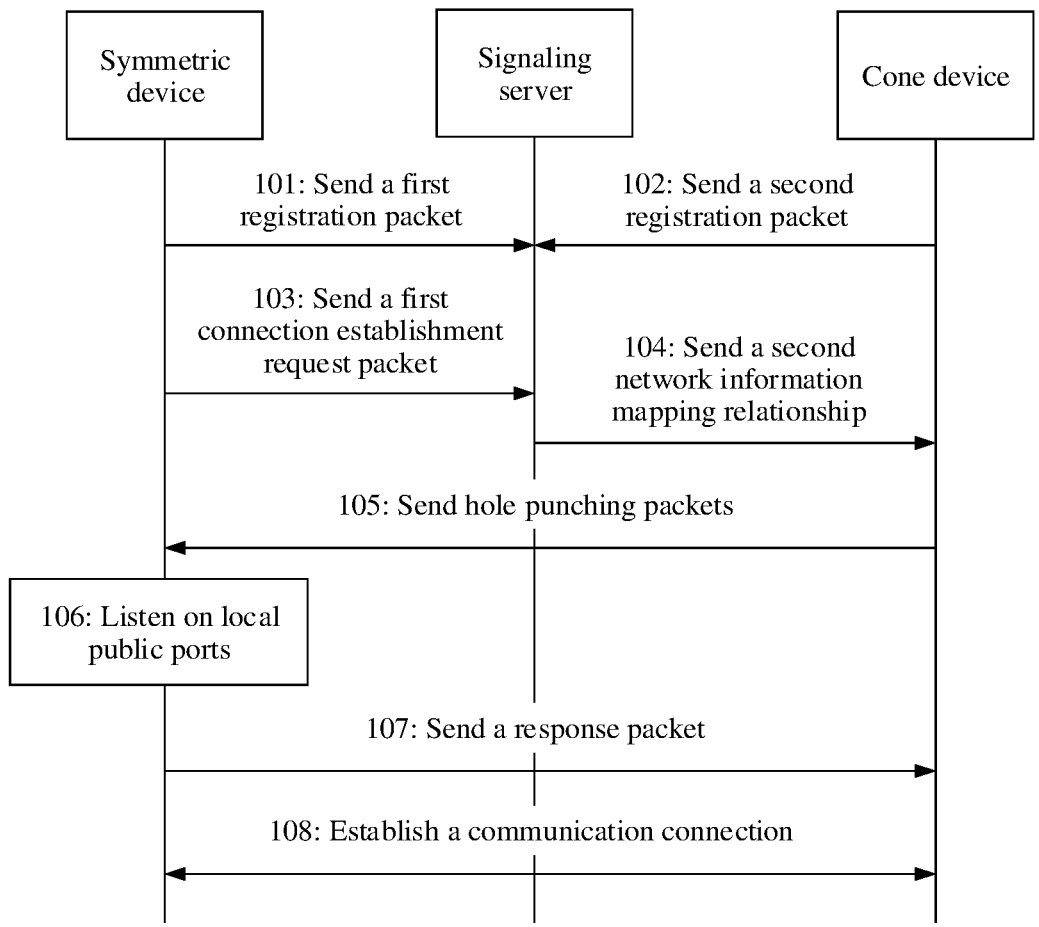
FIG. 3 is a schematic diagram of an embodiment of a communication method according to an embodiment.

The following further describes a solution of the embodiments. Refer to FIG. 3, which is a schematic diagram of an embodiment of a communication method.

As shown in FIG. 3, the embodiment of the communication method includes the following steps.

101: Send a first registration packet.

In this embodiment, a symmetric device sends the first registration packet to a signaling server. The first registration packet carries a second network information mapping relationship. The second network information mapping relationship includes second network information. The second network information mapping relationship and the second network information are included in a packet header of the first registration packet. For example, the second network information mapping relationship includes a second public IP address of the symmetric device and a second public port number of the symmetric device. The second network information includes a user identity (ID) of the symmetric device, a media access control (MAC) address of the symmetric device, or a user name of the symmetric device. For example, the second network information mapping relationship includes a public IP address 202.20.65.4 of the symmetric device and a public port number 4097 of the symmetric device. The second network information includes a user identity 13400000000 of the symmetric device, a MAC address 00-23-24-AD-1B-1B of the symmetric device, or a user name zhangsan, or the like, of the symmetric device.

After the signaling server receives the first registration packet, the second network information mapping relationship and the second network information are associated with the symmetric device and stored by the signaling server.

102: Send a second registration packet.

In this embodiment, a cone device sends the second registration packet to the signaling server. The second registration packet carries first network information. The first network information includes a user identity (ID) of the cone device, a media access control (MAC) address of the cone device, or a user name of the cone device. For example, the user identity of the cone device is 13500000000, the MAC address of the cone device is 00-23-24-AD-1C-1C, and the user name of the cone device is lisi, or the like. The second registration packet further carries a public IP address of the cone device and a public port of the cone device.

After the signaling server receives the second registration packet, the first network information is associated with the cone device and stored by the signaling server.

It should be noted that a sequence between step 101 and step 102 is not limited herein. Step 101 may be performed before or after step 102, or step 101 and step 102 may be performed simultaneously.

103: Send a first connection establishment request packet.

In this embodiment, when the symmetric device initiates a communication request to the cone device, the symmetric device needs to send the first connection establishment request packet to the signaling server first. The first connection establishment request packet is sent by the symmetric device. Therefore, the signaling server may obtain, by searching based on the first connection establishment request packet, the second network information mapping relationship locally stored in the signaling server.

104: Send the second network information mapping relationship.

In this embodiment, after the signaling server finds the locally stored second network information mapping relationship, because the first connection establishment request packet further carries the first network information, for example, the user name "lisi" of the cone device, the signaling server searches for the public IP address and the public port of the cone device based on the first network information, and sends the second network information mapping relationship to the cone device by using the public IP address and the public port of the cone device. The second network information mapping relationship includes the second public IP address of the symmetric device and the second public port number of the symmetric device.

105: Send hole punching packets.

In this embodiment, after receiving the second network information mapping relationship sent by the signaling server, the cone device directly sends the hole punching packets to M public ports of the symmetric device based on the second network information mapping relationship, where M is a natural number greater than 1.

For example, the cone device selects the second public IP address of the symmetric device as a destination address, selects M ports from 65511 ports between a port number 1024 and a port number 66535 as destination port numbers, and sends M hole punching packets. Examples are shown in Table 1.

TABLE 1

| Packet | Destination address | Destination port number | Source address | Source port number |
|---|---|---|---|---|
| First hole punching packet | 202.20.65.4 | 2000 | 202.20.65.5 | 1500 |
| Second hole punching packet | 202.20.65.4 | 2200 | 202.20.65.5 | 1500 |
| Third hole punching packet | 202.20.65.4 | 2500 | 202.20.65.5 | 1500 |
| ... | ... | ... | ... | ... |
| $M^{th}$ hole punching packet | 202.20.65.4 | 25500 | 202.20.65.5 | 1500 |

It should be noted that a port range from the port number 1024 to the port number 66535 is a port range reserved in advance by the cone device and the symmetric device and is merely an example for description. Alternatively, there may be another port range, for example, a port range from a port number 2048 to the port number 66535. This is not limited herein.

106: Listen on local public ports.

In this embodiment, the symmetric device starts to listen on the local public ports after step 101. For example, N local public ports for listening on are randomly selected from local public ports that are within the port range from the port number 1024 to the port number 66535, where N is a natural number greater than 1. For example, 10 local public ports for listening on are selected from the port range from the port number 1024 to the port number 66535 and are a port 2000, a port 2500, a port 3000, a port 3500, a port 4000, a port 4500, a port 5000, a port 5500, a port 6000, and a port 7000 respectively. It should be noted that the N local ports listened on by the symmetric device may be N port numbers regularly distributed or may be N port numbers randomly distributed. This is not limited herein.

It should be noted that the port range from the port number 1024 to the port number 66535 is a port range specified and reserved in advance by the cone device and the symmetric device. The port range from the port number 1024 to the port number 66535 is merely an example for description. There may be another port range, for example, the port range from the port number 2048 to the port number 66535. This is not limited herein.

107: Send a response packet.

In this embodiment, after receiving a hole punching packet from the N local ports listened on by the symmetric device, the symmetric device sends the response packet to the cone device. The response packet carries a first network information mapping relationship that includes a first public internet protocol (IP) address of the symmetric device and a first public port number of the symmetric device.

108: Establish a communication connection.

In this embodiment, after receiving the response packet sent by the symmetric device, the cone device obtains the first public IP address and the first public port number of the symmetric device based on the first network information mapping relationship carried in the response packet. The cone device may establish the communication connection by sending a packet to the first public address and the first public port number of the symmetric device.

In this embodiment, the signaling server receives the registration packets sent by the symmetric device and the cone device. The signaling server is configured to send a network information mapping relationship of the symmetric device to the cone device, to facilitate the cone device to send the hole punching packets. When the symmetric device detects a hole punching packet from the local public ports, the symmetric device sends the response packet to the cone device. The response packet carries a public IP address and a public port number with which the symmetric device can successfully receive a packet. The cone device can break a restriction of the symmetric device (symmetric NAT) by receiving the response packet, to successfully establish the communication connection to the symmetric device. The cone device may directly communicate with the symmetric device and the signaling server only switches addresses, so that there is no need for a server having a data relay function, and costs of deploying the server are reduced.

Figure 4:
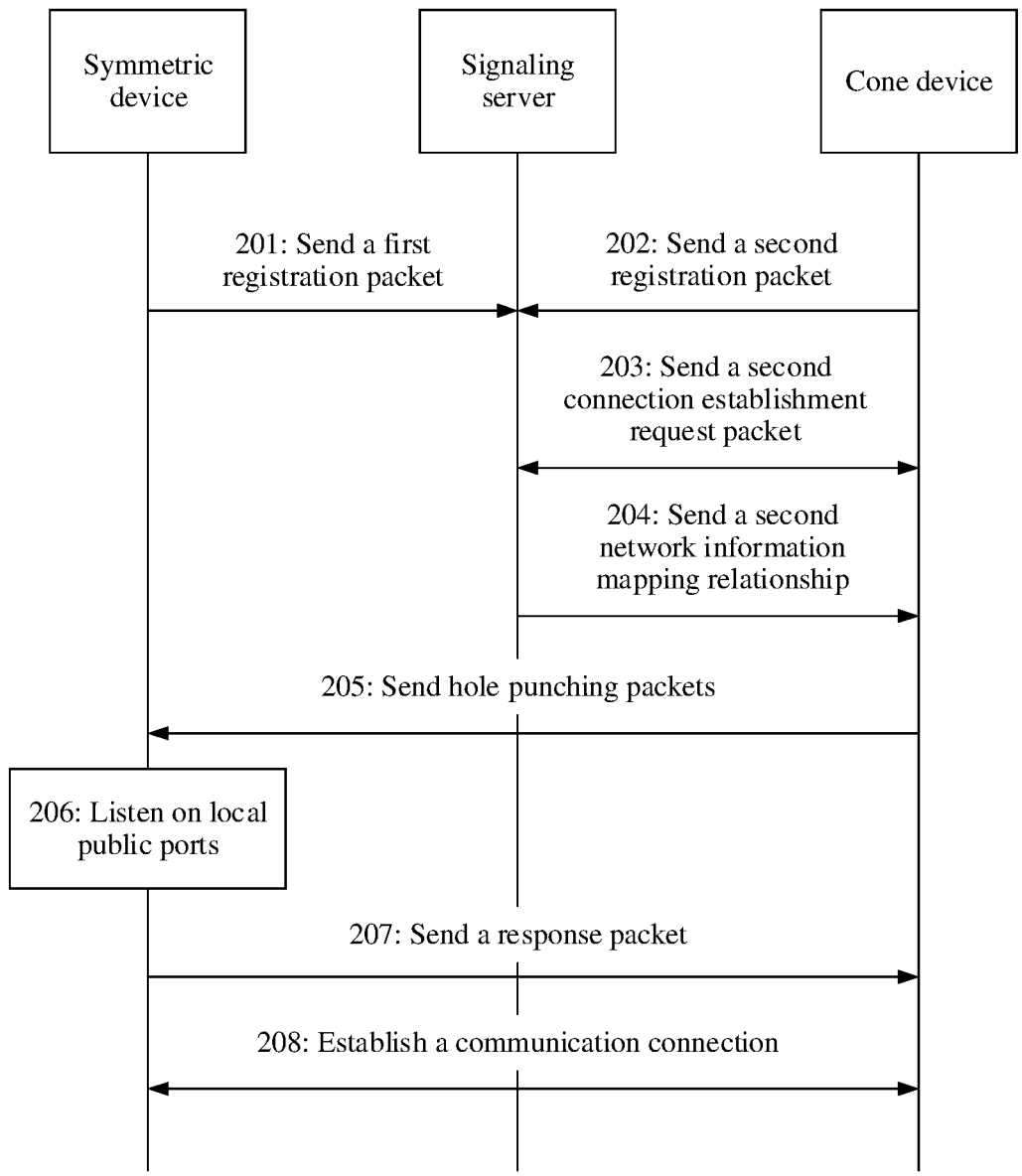
FIG. 4 is a schematic diagram of an embodiment of a communication method according to an embodiment.

As shown in FIG. 4, another embodiment of a communication method includes the following steps.

201: Send a first registration packet.

In this embodiment, step 201 is similar to step 101. Details are not described herein again.

202: Send a second registration packet.

In this embodiment, step 202 is similar to step 102. Details are not described herein again.

203: Send a second connection establishment request packet.

In this embodiment, when the cone device initiates a communication request to the symmetric device, the cone device has to send the second connection establishment request packet to a signaling server first. The second connection establishment request packet carries the second network information, for example, the user name "zhangsan" of the symmetric device. Therefore, the signaling server may obtain, by searching based on the second connection establishment request packet, the second network information mapping relationship locally stored in the signaling server.

204: Send the second network information mapping relationship.

In this embodiment, after the signaling server finds the locally stored second network information mapping relationship, because the second connection establishment request packet is sent by the cone device, the signaling server obtains the public IP address and the public port of the cone device based on a packet header of the second connection establishment request packet and sends the second network information mapping relationship to the cone device by using the public IP address and the public port of the cone device. The second network information mapping relationship includes the second public IP address of the symmetric device and the second public port number of the symmetric device.

205: Send hole punching packets.

In this embodiment, step 205 is similar to step 105. Details are not described herein again.

206: Listen on local public ports.

In this embodiment, step 206 is similar to step 106. Details are not described herein again.

207: Send a response packet.

In this embodiment, step 207 is similar to step 107. Details are not described herein again.

208: Establish a communication connection.

In this embodiment, step 208 is similar to step 108. Details are not described herein again.

In this embodiment, the signaling server receives the registration packets sent by the symmetric device and the cone device. The signaling server is configured to send a network information mapping relationship of the symmetric device to the cone device, to facilitate the cone device to send the hole punching packets. When the symmetric device detects a hole punching packet from the local public ports, the symmetric device sends the response packet to the cone device. The response packet carries a public IP address and a public port number with which the symmetric device can successfully receive a packet. The cone device can break a restriction of the symmetric device (symmetric NAT) by receiving the response packet, to successfully establish the communication connection to the symmetric device. The cone device may directly communicate with the symmetric device and the signaling server only switches addresses, so that there is no need for a server having a data relay function, and costs of deploying the server are reduced.

Further, for example, the symmetric device listens on N local public ports, where N is a natural number greater than 1. The cone device randomly selects M public ports to send the hole punching packets, where M is a natural number greater than 1. A selection range of M and N is, for example, the port range from the port number 2048 to the port number 66535, to describe that a success rate of NAT traversal in this solution is high.

For example, the selection range of M and N is the port range from the port number 2048 to the port number 66535, and there are totally 63487 ports within the port range. Therefore, a probability that the M ports are not among the N ports listened on by the symmetric device is:

$$A = \frac{C_{63487-N}^{M}}{C_{63487}^{M}},$$

where

A is the probability that the M ports are not among the N ports listened on by the symmetric device.

A probability that the M ports are among the N ports listened on by the symmetric device, namely, a NAT traversal probability (or referred to as a success rate of port prediction), is:

$$B = 1 - A = 1 - \frac{C_{63487-N}^{M}}{C_{63487}^{M}} = 1 - \Pi_{X=0}^{M-1} \frac{63487 - X - N}{63487 - X},$$

where

B is a success rate of NAT traversal.

By substituting a plurality of groups of M and N for calculation, it can be concluded that the success rate of NAT traversal in the communication method proposed in this solution is high. For example, when N=400 and M=500, the success rate of NAT traversal is 95.8%; and when N=100 and M=500, the success rate of NAT traversal is 54.6%. It should be noted that only an example is used for description herein, and specific values M and N are not limited.

The foregoing mainly describes the solution provided in this embodiment from a perspective of interaction. It may be understood that to implement the foregoing functions, the cone device and the symmetric device include corresponding hardware structures and/or software modules for implementing the functions. A person of ordinary skill in the art should easily be aware that, in combination with modules and algorithm steps of the examples described in the embodiments, the embodiments may be implemented by hardware or a combination of hardware and computer software. Whether a function is performed by hardware or hardware driven by computer software depends on particular applications and design constraints of the solution. A person of ordinary skill in the art may use different methods to implement the described functions for each particular application, but it should not be considered that the implementation goes beyond the scope of the embodiments.

In this embodiment, function module division may be performed on the symmetric device and the cone device based on the foregoing method embodiment. For example, each function module may be divided based on each function, or two or more functions may be integrated in one processing module. The integrated module may be implemented in a form of hardware or may be implemented in a form of a software function module. It should be noted that, in this embodiment, module division is an example, and is merely logical function division. In actual implementation, another division manner may be used.

Figure 5:
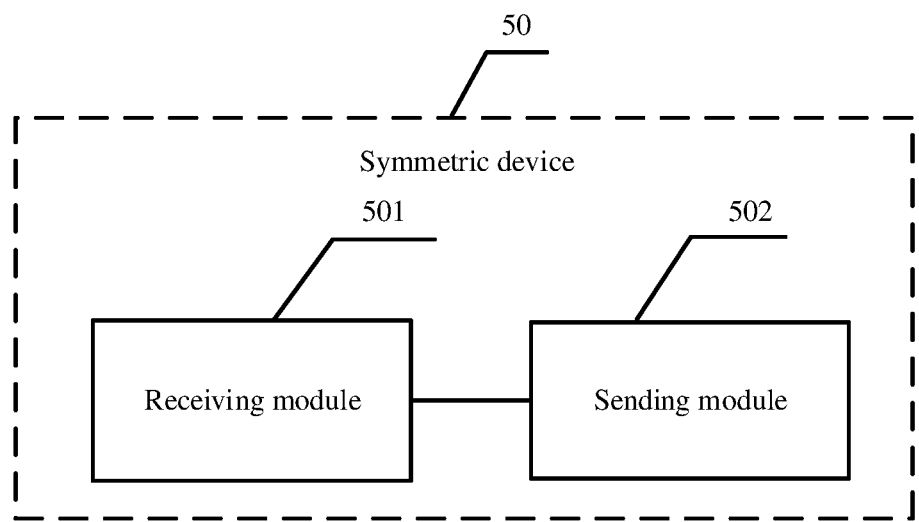
FIG. 5 is a schematic diagram of an embodiment of a symmetric device according to an embodiment.

The following describes the symmetric device in the embodiments in detail. Refer to FIG. 5, which is a schematic diagram of an embodiment of a symmetric device. The symmetric device 50 includes:

a receiving module 501, configured to listen on N local public ports, where N is a natural number greater than 1; and a sending module 502, configured to send a response packet to a cone device based on a hole punching packet when the receiving module 501 receives the hole punching packet from the N local public ports, so that the symmetric device 50 establishes a communication connection to the cone device, where the hole punching packet is sent by the cone device, and the response packet carries a first network information mapping relationship.

In some embodiments, the symmetric device 50 includes:

the sending module 502, further configured to send a first connection establishment request packet to a signaling server, where the first connection establishment request packet carries first network information, so that the signaling server sends a second network information mapping relationship to the cone device based on the first network information.

In some embodiments, the symmetric device 50 includes:

the sending module 502, further configured to send, by the symmetric device 50, a first registration packet to the signaling server, where the first registration packet carries the second network information mapping relationship, and the second network information mapping relationship includes second network information.

In the foregoing embodiment, the receiving module may be implemented by a receiver, a receiver circuit, or an input interface, and the sending module may be implemented by a transmitter, a transmitter circuit, or an output interface.

Figure 6:
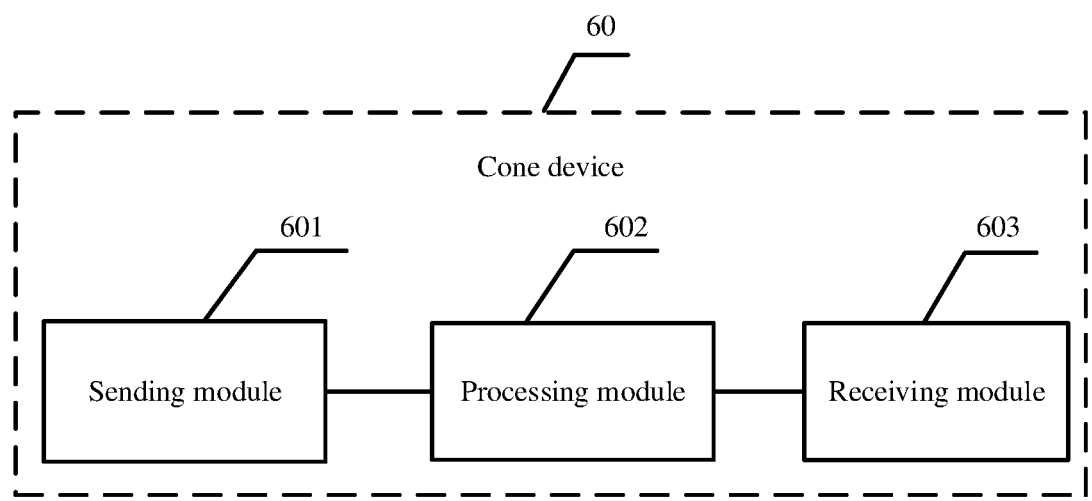
FIG. 6 is a schematic diagram of an embodiment of a cone device according to an embodiment.

The following describes the cone device in the embodiments in detail. Refer to FIG. 6, which is a schematic diagram of an embodiment of a cone device according to an embodiment. The cone device 60 includes:

a sending module 601, configured to send hole punching packets to M public ports of a symmetric device, where M is a natural number greater than 1; and a processing module 602, configured to establish a communication connection to the symmetric device based on a response packet, where the response packet is a packet sent by the symmetric device based on a hole punching packet, and the response packet carries a first network information mapping relationship.

In some embodiments, the cone device 60 includes:

a receiving module 603, configured to receive a second network information mapping relationship, where the second network information mapping relationship is sent by a signaling server to the cone device 60 based on a first connection establishment request packet, and the first connection establishment request packet is sent by the symmetric device.

In some embodiments, the cone device 60 includes:

the sending module 601, further configured to send a second connection establishment request packet to the signaling server, where the second connection establishment request packet carries second network information, so that the signaling server sends the second network information mapping relationship to the cone device 60 based on the second network information; and the receiving module 603, further configured to receive the second network information mapping relationship.

In some embodiments, the cone device 60 includes:

the sending module 601, configured to send the hole punching packets to the M public ports of the symmetric device based on the second network information mapping relationship.

In some embodiments, the cone device 60 includes:

the sending module 601, further configured to send a second registration packet to the signaling server, where the second registration packet carries first network information.

In the foregoing embodiment, the processing module may be implemented by a processor, the receiving module may be implemented by a receiver, a receiver circuit, or an input interface, and the sending module may be implemented by a transmitter, a transmitter circuit, or an output interface.

It should be noted that content such as information exchange between the modules/units of the apparatus and the execution processes thereof is based on the same idea as the method embodiments, and produces the same effects as the method embodiments. For the specific content, refer to the foregoing description in the method embodiments, and details are not described herein again.

Figure 7:
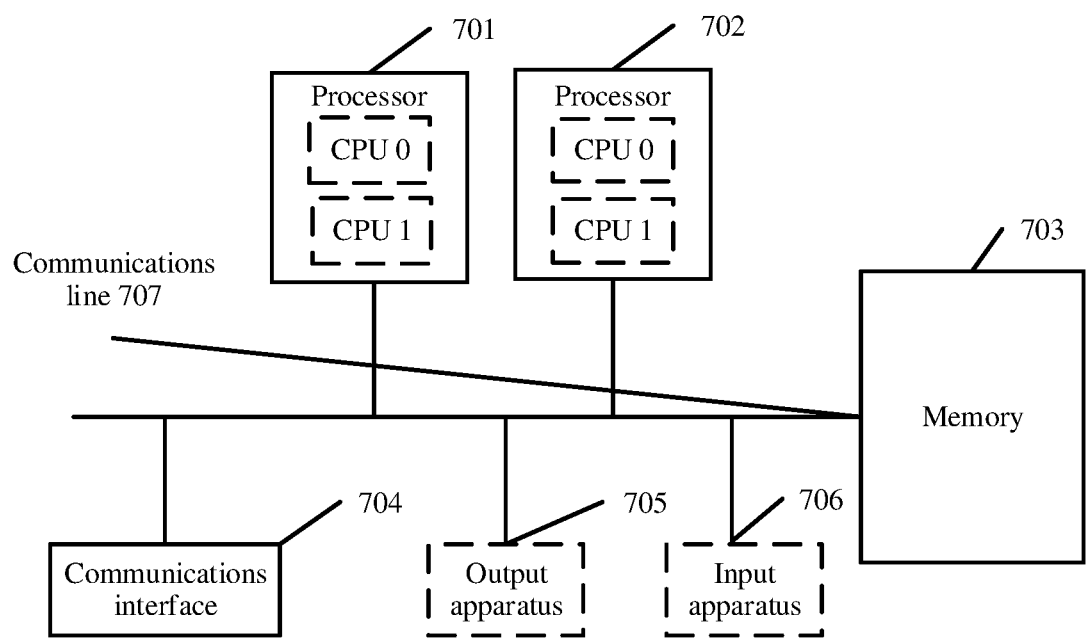
FIG. 7 is a schematic diagram of a hardware structure of a communications apparatus according to an embodiment.

The symmetric device and the cone device in the embodiments are described above from a perspective of modular function entity. The symmetric device and the cone device in the embodiments are described below from a perspective of hardware processing. FIG. 7 is a schematic diagram of a hardware structure of a communications apparatus according to an embodiment. As shown in FIG. 7, the communications apparatus may include:

The communications apparatus includes at least one processor 701, a communications line 707, a memory 703, and at least one communications interface 704.

The processor 701 may be a general-purpose central processing unit (CPU), a microprocessor, an application-specific integrated circuit (ASIC), or one or more integrated circuits configured to control program execution of the solutions of the embodiments.

The communications line 707 may include a path for transmitting information between the foregoing components.

The communications interface 704 is any apparatus such as a transceiver and is configured to communicate with another apparatus or a communications network, for example, the Ethernet.

The memory 703 may be a read-only memory (ROM), another type of static storage device that may store static information and instructions, a random access memory (RAM), or another type of dynamic storage device that may store information and instructions. The memory may exist independently and is connected to the processor by the communications line 707. Alternatively, the memory may be integrated with the processor.

The memory 703 is configured to store computer-executable instructions for executing the solutions of the embodiments, and the processor 701 controls the execution. The processor 701 is configured to execute the computer-executable instructions stored in the memory 703, to implement the communication methods provided in the foregoing embodiments.

Optionally, the computer-executable instructions in this embodiment may also be referred to as application code. This is not limited in this embodiment.

During specific implementation, in an embodiment, the communications apparatus may include a plurality of processors, such as the processor 701 and a processor 702 in FIG. 7. Each of these processors may be a single-core (single-CPU) processor or a multi-core (multi-CPU) processor. The processor herein may be one or more apparatus, circuits, and/or processing cores for processing data (for example, computer program instructions).

During specific implementation, in an embodiment, the communications apparatus may further include an output apparatus 705 and an input apparatus 706. The output apparatus 705 communicates with the processor 701 and may display information in a plurality of manners. The input apparatus 706 communicates with the processor 701 and may receive a user input in a plurality of manners. For example, the input apparatus 706 may be a mouse, a touchscreen apparatus, or a sensing apparatus.

The communications apparatus may be a general-purpose apparatus or a special-purpose apparatus. During specific implementation, the communications apparatus may be a desktop computer, a portable computer, a network server, a wireless terminal apparatus, an embedded apparatus, or an apparatus having a structure similar to that shown in FIG. 7. A type of the communications apparatus is not limited in this embodiment.

All or some of the foregoing embodiments may be implemented by using software, hardware, firmware, or any combination thereof. When software is used to implement the embodiments, all or some of the embodiments may be implemented in a form of a computer program product.

It may be clearly understood by a person of ordinary skill in the art that, for convenient and brief description, for a detailed working process of the foregoing symmetric device, cone device, units, and modules, refer to corresponding processes in the foregoing method embodiments. Details are not described herein again.

In the several embodiments provided in the embodiments, it should be understood that the disclosed devices and methods may be implemented in other manners. For example, the described embodiments of the symmetric device and cone device are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the modules or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments may be integrated into one processing unit, or each of the units may exist alone physically, or two or more units may be integrated into one unit. The integrated unit may be implemented in a form of hardware or may be implemented in a form of a software functional unit.

When the integrated unit is implemented in a form of a software functional unit and sold or used as an independent product, the integrated unit may be stored in a computer-readable storage medium. Based on such an understanding, the solutions of the embodiments essentially, or the part contributing to the conventional art, or all or some of the solutions may be implemented in the form of a software product. The computer software product is stored in a storage medium and includes several instructions for instructing a computer device (which may be a personal computer, a server, or a network device) to perform all or some of the steps of the methods described in the embodiments. The foregoing storage medium includes any medium that can store program code, such as a USB flash drive, a removable hard disk, a read-only memory (ROM), a random access memory (RAM), a magnetic disk, or an optical disc.

The foregoing embodiments are merely intended for describing the solutions of the embodiments, but are not limiting. Although the solutions described in detail with reference to the foregoing embodiments, a person of ordinary skill in the art should understand that they may still make modifications to the solutions described in the foregoing embodiments or make equivalent replacements to some features thereof, without departing from the spirit and scope of the solutions of the embodiments.

What is claimed is:

1. A communication method, comprising:
   listening, by a symmetric device, on N local public ports, wherein N is a natural number greater than 1; and
   when the symmetric device receives a hole punching packet from the N local public ports, sending, by the symmetric device, a response packet to a cone device based on the hole punching packet, so that the symmetric device establishes a communication connection to the cone device, wherein the hole punching packet is sent by the cone device, the response packet carries a first network information mapping relationship, and the cone device is configured to establish a direct communication connection to the symmetric device based on the first network information mapping relationship; and,
   before listening by the symmetric device on the N local public ports, the method further comprises:
   sending, by the symmetric device, a first connection establishment request packet to a signaling server, wherein the first connection establishment request packet carries first network information, the signaling server obtains, by searching based on a second connection establishment request packet, a second network information mapping relationship locally stored in the signaling server, and the signaling server sends the second network information mapping relationship to the cone device based on the first network information.

2. The method according to claim 1, wherein before sending by the symmetric device of the first connection establishment request packet to the signaling server, the method further comprises:
   sending, by the symmetric device, a first registration packet to the signaling server, wherein the first registration packet carries the second network information mapping relationship, and the second network information mapping relationship comprises second network information.

3. The method according to claim 2, wherein the second network information comprises a user identity (ID) of the symmetric device, a media access control (MAC) address of the symmetric device, or a user name of the symmetric device.

4. The method according to claim 1, wherein the first network information mapping relationship comprises a first public internet protocol (IP) address of the symmetric device and a first public port number of the symmetric device.

5. The method according to claim 4, wherein the second network information mapping relationship comprises a second public IP address of the symmetric device and a second public port number of the symmetric device.

6. The method according to claim 1, wherein the second network information mapping relationship comprises a second public IP address of the symmetric device and a second public port number of the symmetric device.

7. The method according to claim 1, wherein the first network information comprises a user identity (ID) of the cone device, a media access control (MAC) address of the cone device, or a user name of the cone device.

8. A communication method, comprising:
sending, by a cone device, hole punching packets to M public ports of a symmetric device, wherein M is a natural number greater than 1; and
establishing, by the cone device, a communication connection to the symmetric device based on a response packet, wherein the response packet is a packet sent by the symmetric device based on the hole punching packet, the response packet carries a first network information mapping relationship, and the cone device is configured to establish a direct communication connection to the symmetric device based on the first network information mapping relationship; and
before sending by the cone device the hole punching packets to the M public ports of the symmetric device, the method further comprises:
sending, by the cone device, a second connection establishment request packet to a signaling server, wherein the second connection establishment request packet carries second network information, the signaling server obtains, by searching based on the second connection establishment request packet, a second network information mapping relationship locally stored in the signaling server, and the signaling server sends the second network information mapping relationship to the cone device based on the second network information; and
receiving, by the cone device, the second network information mapping relationship.

9. The method according to claim 8, wherein the sending, by the cone device, of the hole punching packets to M public ports of the symmetric device comprises:
sending, by the cone device, the hole punching packets to the M public ports of the symmetric device based on the second network information mapping relationship.

10. The method according to claim 8, wherein before receiving by the cone device the second network information mapping relationship, the method further comprises:
sending, by the cone device, a second registration packet to the signaling server, wherein the second registration packet carries first network information.

11. The method according to claim 10, wherein the first network information comprises a user identity (ID) of the cone device, a media access control (MAC) address of the cone device, or a user name of the cone device.

12. The method according to claim 8, wherein the first network information mapping relationship comprises a first public internet protocol (IP) address of the symmetric device and a first public port number of the symmetric device.

13. The method according to claim 8, wherein the second network information mapping relationship comprises a second public IP address of the symmetric device and a second public port number of the symmetric device.

14. The method according to claim 8, wherein the second network information comprises a user identity (ID) of the symmetric device, a media access control (MAC) address of the symmetric device, or a user name of the symmetric device.

15. A computer device, comprising:
an input/output (I/O) interface, a processor, and a memory, wherein the memory stores program instructions; and when the instructions are executed by the computer device, the computer device performs the following operations:
listening on N local public ports, wherein N is a natural number greater than 1; and, when the computer device receives a hole punching packet from the N local public ports,
sending a response packet to a cone device based on the hole punching packet, so that the computer device establishes a communication connection to the cone device, wherein the hole punching packet is sent by the cone device, the response packet carries a first network information mapping relationship, and the cone device is configured to establish a direct communication connection to the symmetric device based on the first network information mapping relationship; and
wherein before listening on the N local public ports, the method further comprises:
sending a first connection establishment request packet to a signaling server, wherein the first connection establishment request packet carries first network information, the signaling server obtains, by searching based on a second connection establishment request packet, a second network information mapping relationship locally stored in the signaling server, and the signaling server sends the second network information mapping relationship to the cone device based on the first network information.

16. The computer device according to claim 15, wherein the operations further comprise:
before sending by the symmetric device the first connection establishment request packet to the signaling server,
sending a first registration packet to the signaling server, wherein the first registration packet carries the second network information mapping relationship, and the second network information mapping relationship comprises second network information.

17. The computer device according to claim 16, wherein the second network information comprises a user identity (ID) of the symmetric device, a media access control (MAC) address of the symmetric device, or a user name of the symmetric device.

18. The computer device according to claim 15, wherein the first network information mapping relationship comprises a first public internet protocol (IP) address of the symmetric device and a first public port number of the symmetric device.

19. The computer device according to claim 15, wherein the second network information mapping relationship comprises a second public internet protocol (IP) address of the symmetric device and a second public port number of the symmetric device.

20. The computer device according to claim 15, wherein the first network information comprises a user identity (ID) of the cone device, a media access control (MAC) address of the cone device, or a user name of the cone device.

* * * * *